Oct. 7, 1969 P. H. DE GROAT 3,471,638

ELIMINATION OF CONTROL SIGNAL DEGRADATION IN LANDLINE FACSIMILE TRANSMISSION SYSTEMS

Filed May 26, 1966

INVENTOR.
PAUL H. DE GROAT

BY

ATTORNEYS 3,471,638
Patented Oct. 7, 1969

3,471,638

ELIMINATION OF CONTROL SIGNAL DEGRADATION IN LANDLINE FACSIMILE TRANSMISSION SYSTEMS

Paul H. De Groat, Webster, N.Y., assignor to Xerox Corporation, Rochester, N.Y., a corporation of New York Filed May 26, 1966, Ser. No. 553,230
Int. Cl. H04n 7/00, 5/76; H04m 11/00
U.S. Cl. 178—6 3 Claims

ABSTRACT OF THE DISCLOSURE

Circuit apparatus in a graphic communication system for eliminating copy degrading effects of a time tone signal periodically introduced into the telephone channel during operation. In certain common carrier telephone systems, a time tone signal is periodically introduced to indicate to the user the successive time intervals during which the line has been in use. By the use of band rejection filters and harmonic traps, the time tone signals and any cross modulation products thereof must be eliminated to allow undistorted data signals to be detected from the received information data from the common carrier telephone medium.

This invention relates to facsimile apparatus and more particularly to methods and apparatus for minimizing copy degradation occasioned in landline facsimile systems due to carrier introduced control signals.

In many aspects of the business world it is often desirable to rapidly and economically transmit graphic information between one or more remote points and a central point. For example, in the business community it is often advantageous for a salesman to be able to efficiently and economically transmit orders to the central office for acceptance and/or filment. Additionally in the newspaper business it is often desirable for reporters to be able to quickly and completely dispatch graphic information to the main office for processing. The use of two way radios and telephones while extremely advantageous in obtaining rapid communications have not offered a complete solution for unaided they are unable to transmit graphic information effectively.

Facsimile systems are well known in the art in which a transmitter converts information on a document through, for example, an electro-optical scanning system, into electrical signals suitable for transmission over wire or radio communication networks. At the facsimile receiver the electrical signals in conjunction with suitable synchronizing signals control marking apparatus which in response to the received electrical signals recreates a facsimile or copy of the original document.

While prior art facsimile systems similar to that broadly described above have been found useful in providing a method of graphic communication between remote points they have not found widespread use in the business community because of the several inherent limitations. One of the principal limitations has been the availability of low cost communication networks suitable for the transmission of facsimile signals. With the introduction of the Xerox-Magnafax Telecopier the problem of low cost, readily available transmission media for facsimile signals has been significantly minimized. The Xerox-Magnafax Telecopier, which is commercially available from the Xerox Corporation, provides an inexpensive, light weight facsimile transceiver that may be employed for transmitting and receiving facsimile signals over standard telephone transmission lines.

With the advent of mass communications including vast, globe encircling satellites and trans-oceanic cable telephone networks it is possible to establish telephone communication circuits between nearly any two cities in the world. Thus by employing the hereinbefore described Xerox-Magnafax Telecopier it would be possible to transmit graphic information between any two telephone terminals which may be interconnected through the telephone communication networks. While such international telephone links have been useful in establishing voice communications they have not been totally satisfactory for facsimile transmission systems primarily because of the non-standardized signaling frequency zones which are employed in the various telephone systems for various control functions.

As is known in order to obtain faithful reproductions of the original documents transmitted via facsimile systems, it is essential that the received signals be faithful reproductions of the originally transmitted signals. Particularly where the facsimile signals are to be transmitted over non-standardized telephone systems, i.e., those employing varying or different control signals within or adjacent the facsimile signal spectrum it is necessary that the effects of any control signal introduced in the system be minimized. For example, in various telephone systems a time signal tone is automatically introduced by the telephone company into the transmission path every three minutes. Such a time signal tone and the cross modulation products thereof must be effectively eliminated from the facsimile signal spectrum prior to the actuation of the facsimile printer.

It is therefore an object of the present invention to provide methods and apparatus for eliminating the copy degradation effects of control signals interfering with facsimile signals transmitted over landline telephone facilities.

It is a further object of the present invention to increase compatibility of landline facsimile apparatus with various telephone system specifications.

It is a further object of the present invention to improve graphic communication systems operable over landline telephone networks.

It is a still further object of the present invention to expand the useability of conventional telephone lines for transmission of facsimile systems.

For a more complete understanding of applicant's invention and the various embodiments thereof reference may be had to the following detailed description in conjunction with the drawings in which.

Figures 1, 2, 3:
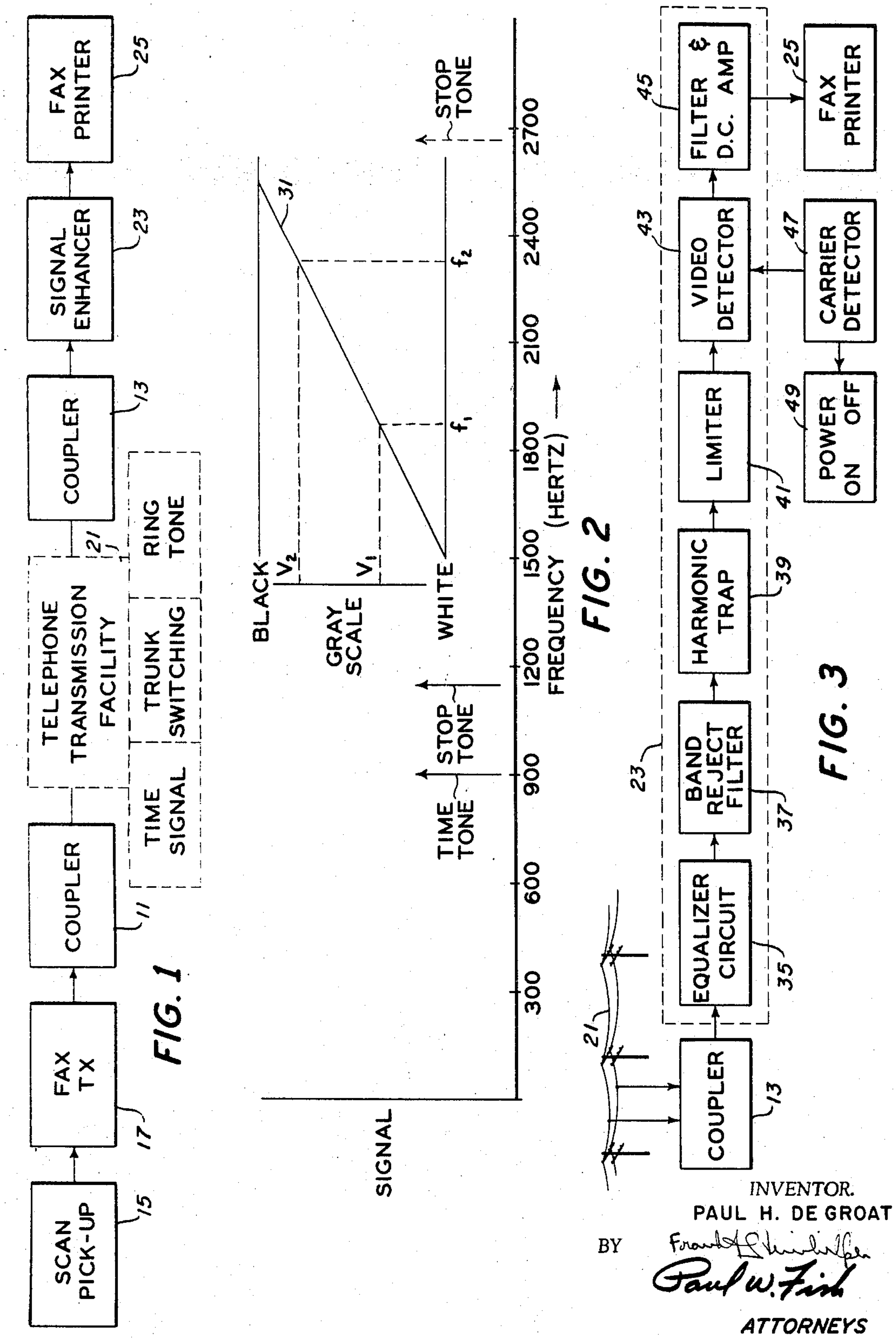
FIG. 1 is a block diagram of a simplex facsimile system embodying the principles of the present invention.
FIG. 2 is a graph illustrating the signal distribution for a typical landline facsimile system.
FIG. 3 is a block diagram of a facsimile receiver embodying the principles of the present invention.

Referring now to FIG. 1 there is shown a block diagram of a simplex facsimile system operable over conventional telephone lines. In operation after an initial connection has been established, for example, by dialing the desired telephone number, the handsets of the telephones at transmitting and receiving stations would be deposited into couplers 11 and 13 which may, for example, comprise acoustic couplers. Other types of couplers or transducers would, of course, be operable. A document to be transmitted would then be advanced past a scanning station of the facsimile transmitter whereby in accordance with known principles the information on the document would be converted into suitable electric video signals, for example, by means of an electro-optical scanning apparatus. The signals emanating from the facsimile scanner 15 are coupled to the input of a facsimile transmitter 17. The facsimile transmitter may comprise a voltage controlled oscillator which generates appropriate tonal signals for transmission over the telephone line in response to the various levels of the analog video signal from the scanner pick up 15. The output of the facsimile transmitter is coupled to the input of the coupler 11 which as hereinbefore described may comprise an acoustic coupler wherein, in the transmitting mode, a speaker would be selectively energized to couple acoustic tonal facsimile signals and appropriate phasing and synchronizing signals to the mouth piece of the transmitting telephone. From the mouth piece of the transmitting telephone the signals are transmitted via the telephone transmission facility 21 in the normal manner.

As is known, in the telephone transmission facility signals are automatically generated by the carrier for controlling, for example, trunk signaling apparatus and ring tone apparatus. Similarly, in many applications a time signal is automatically inserted by the telephone facility into the audio spectrum of the transmission line in use to signal periodically the successive time intervals during which the particular telephone line has been in use. Such time signals are primarily intended to non-interferingly indicate to the user of the telephone line the amount of time the line has been in use. However, since the time tones do fall within the audio range, the fundamental signal tone frequency, harmonics and cross products thereof are likely to conflict with tonal frequency facsimile signals transmitted via the standard telephone line.

From the ear piece of the receiving telephone the tonal facsimile signals are coupled from line coupler 13 to signal enhancer circuit 23. In a manner hereinafter to be more fully described the signal enhancer 23 includes means for enhancing the operation of the facsimile receiver with respect to received facsimile signal tonal frequencies. Such means are effective to emphasize the facsimile signals after the passage of the signals through the acoustic coupler and to de-emphasize or eliminate the effects of all unwanted extraneous signals prior to the actuation thereby of the facsimile printer. By emphasizing the facsimile signals and de-emphasizing all other signals the copy reproduced at the facsimile receiver constitutes a faithful copy of the document scanned at the transmitter. The signals emanating from the signal enhancer circuit 23 are coupled to the facsimile printer 25 wherein, in the known manner, a facsimile copy of the document scanned at the transmitter station is reconstituted at the remote receiving station.

The majority of the various circuits or subassemblies of the facsimile system illustrated in FIG. 1 form no part of the present invention and therefore will not be explained in detail. Any facsimile transmitting apparatus known in the art for converting information on a document into tonal frequency signals suitable for transimission over telephone communication facility may be employed in practicing the principles of the present invention. Similarly any receiving apparatus responsive to such tonal frequency signals may be utilized at the receiving terminal. For a more complete understanding of the structure and operation of illustrative facsimile apparatus which may be employed in the embodiments shown in FIG. 1 reference may be had to the following copending applications which are herewith incorporated herein by reference: Facsimile Systems, Ser. No. 176,248, now abandoned, filed Feb. 28, 1962, in the name of Glenn E. Reese, et al., and Facsimile Transmission Systems, U.S. application No. 458,954, filed May 26, 1965, in the name of R. J. Crookshanks, et al.

Referring now to FIG. 2 there is shown a plot of an illustrative frequency distribution of the various signaling tones and facsimile signal spectrum employed in a tonal facsimile system capable of transmitting over commercial telephone networks. As shown the time tone signal which as hereinbefore stated is customarily periodically inserted by the telephone company may comprise a tone signal in the order of 900 hertz. A typical grey scale facsimile signal frequency spectrum is shown by the transfer characteristic curve 31 of, for example, a voltage controllable oscillator. The oscillator would be employed for converting the essentially analog video signal from the scan pick up 15 into suitable tonal frequency signals for transmission over telephone circuits. As shown $V_1$ may correspond to $f_1$ and $V_2$ may correspond to $f_2$ in the normal operation of, for example, a voltage controlled oscillator. A suitable stp tone signal may be generated to indicate the end of each message transmission and as shown such signal may, for example, be above or below the signal spectrum depending upon the distribution of the signal spectrum within the bandwidth of the communication system and the frequency of other control signals.

As is known in the art, a facsimile receiver must be capable of reproducing the transmitted signals in order to produce a faithful reproduction of the original copy. Particularly where the facsimile signals are adapted for transmission over a narrow band transmission medium, care must be taken to minimize the effect of control signals and other extraneous noise signals to insure they neither interfere with nor are confused with the legitimate facsimile signals. For example, as shown in FIG. 2 the grey scale graduations or levels between white and black levels correspond to particular frequencies. Either extraneous noise or cross modulation products of extraneous signals or control signals with the facsimile signals may shift a particular facsimile tonal signal in the frequency domain resulting in the generation of an error in the reconstituted facsimile copy at the facsimile receiver.

Particularly where periodic time signals are interjected into the telephone transmission facility by the common carrier, the facsimile apparatus must be capable of ignoring the fundamental frequency thereof and any cross products which result from the modulation of such control tone signal with the facsimile tonal signals. Examination of the FIGURE 2 indicates that for a time tone in the range of 900 hertz appropriate care must be taken to eliminate any cross product (sum) of the lowest or white facsimile signal (i.e., about 1,500 hertz) and the time signal (900 hertz) which would produce an extraneous or error signal in the range of the darkest grey facsimile frequency tonal signal (2,400 hertz). As the video detector 43 is the major source of the cross modulation product, the elimination of the time signal tone effectively eliminates said cross modulation product.

Referring now to FIG. 3 there is shown a facsimile receiver embodying the principles of the present invention. As hereinbefore described the tonal signals from the telephone line 21 include the facsimile tonal signal and control signals introduced by the telephone utility. From the coupler 13 the tonal signal and the control signals are coupled to the input of the signal enhancing circuit 23. As shown the first stage of the signal enhancing circuit 23 comprises an equalizer circuit which is arranged to compensate for delay and amplitude distortion introduced during the transmission of the facsimile signals over the interconnecting telephone facility. The output of the equalizer circuit is coupled to a band reject filter 37 which is adapted to reject or eliminate any control signals which are periodically coupled to the telephone line by the transmission utility. As hereinbefore stated such control signals and the resulting cross product of such control signals with the legitimate facsimile tonal signals must be eliminated to avoid generation of degraded facsimile copies as such signals would be recognized by the video detector as legitimate facsimile video signals. In the preferred embodiment the band reject filter 37 may comprise a narrow notch filter, for example, a twin T having a center frequency corresponding to that frequency employed as the time tone signal. The output of the band reject filter 37 is coupled to a harmonic trap 39 which is designed to eliminate the second harmonic components of the facsimile signal spectrum from the received signals. In an exemplary embodiment, corresponding to the facsimile signal frequency spectrum illustrated in FIG. 2, the harmonic trap would have a rejection band from 2,900 to 3,500 hertz.

The output from the harmonic trap, which comprises the received signals having the non-facsimile signals de-emphasized in comparison to the legitimate facsimile tonal signals, is coupled to the input of limiter amplifier 41. Limiter amplifier 41 may comprise a squaring amplifier in which the amplitude of the equalized signals is limited to a substantially uniform level thereby eliminating any amplitude modulation that may have been superimposed on the carrier by noise, etc. Amplifier 41 is also preferably effective to amplify the limited signals and restore their magnitude to a more useful signal level.

The output of amplifier limiter 41 is coupled to the input of video detector 43. Video detector 43 may comprise an FM demodulator which produces a base band signal substantially identical to the base band signal from the scan pick-up transducer 15 as shown in FIG. 1. The output of the video detector 43 is coupled to a filter and DC amplifier 45. In the filter and amplifier circuit 45 the signals are filtered to eliminate any high frequency signals and pass only those signals having frequencies in the range of the original base band signals. The output of the filter and DC amplifier circuit 45 is coupled to the input of the facsimile printer 25 which in accordance with known procedures selectively actuates a marking device in conjunction with suitable facsimile synchronizing and phasing signals to produce a facsimile or copy of the original document.

In order to operate the receiver only during reception of facsimile signals, an appropriate carrier detector 47 may be arranged to detect the presence at the video detector 43 of significant energy within the facsimile signal spectrum. In this manner it is possible to operate control apparatus 49 for controlling the power applied to the facsimile receiver. As hereinabove referred to in conjunction with FIG. 2 appropriate stop tones may be generated at the transmitter and transmitted to the receiver to selectively control the actuation and de-actuation of the receiver apparatus. When a carrier detector circuit is employed, the band reject and harmonic traps and the respective stop tone frequencies must be compatible to insure proper operation thereof.

In the foregoing there has been described a novel method and unique apparatus for eliminating copy degradation resulting from the introduction of control signal frequencies into the tone signal spectrum of a facsimile system operated over landline telephone facilities. While the invention has been described in terms of a specific frequency time signal tone, a number of similar frequency signals may be rejected by appropriately designing the range of the band reject filter and harmonic trap respectively. Further, depending upon the respective frequency of the control signal and the facsimile signal spectrum it is desirable to reduce the modulation products below a level where they would interfer with the generation of accurate facsimile copy. While the foregoing has described appropriate signal enhacing apparatus at the receiving terminal, such apparatus may be incorporated in a transceiver. Further, it is possible in accordance with the present teaching to incorporate appropriate filter means between the facsimile transmitter and acoustic coupler to avoid the generation of unwanted signals in the telephone transmission facility. The foregoing specification and drawings are to be understood as illustrative only and in no sense limiting. It is therefore applicant's intention to be limited only as indicated by the scope of the appended claims.

What is claimed is:

1. A graphic communication system operable over standard commercial telephone transmission facilities comprising:

scanning means for generating electric video signals corresponding to the reflectivity along a predetermined scanning raster of a document to be transmitted, modulation means for generating predetermined frequency facsimile signals within a tonal frequency signaling spectrum in response to various levels of said video signals, first coupling means for coupling said facsimile signals from said modulation means to an input terminal of said telephone transmission facility, second coupling means for coupling tonal frequency signals from an output terminal of said telephone transmission facility to a receiver, first filter means coupled to said second coupling means for eliminating copy degrading effects occasioned by control signals introduced into the facsimile signal tonal frequency signaling spectrum by the transmission facilities, second filter means for eliminating second harmonic components of the tonal frequency facsimile signals emanating from said second coupling means, demodulator means at said receiver responsive to signals emanating from said second filter means for generating recording signals from said tonal signals, and marking means responsive to said recording signals for reproducing a copy of said document in response thereto.

2. The system defined in claim 1 wherein said first filter means comprises a narrow notch twin T filter having a center frequency corresponding to the fundamental frequency of a predetermined tonal control signal frequency.

3. The system defined in claim 1 wherein said first filter means comprises means for eliminating the fundamental frequency component of a predetermined control tone signal, whereby the cross modulation products of said control tone signal with said facsimile tonal signals are also eliminated.

References Cited

UNITED STATES PATENTS

| | | | |
|---|---|---|---|
| 2,506,437 | 5/1950 | Watson | 179—2 |
| 2,771,545 | 11/1956 | Doelz | 250—8 |
| 2,881,251 | 4/1959 | Strip | 179—2 |
| 2,903,517 | 9/1959 | Ridings | 179—4 |
| 3,289,083 | 11/1966 | Barr et al. | 325—59 |
| 3,340,364 | 9/1967 | Brightman et al. | 179—15 |

ROBERT L. GRIFFIN, Primary Examiner

R. K. ECKERT, Jr., Assistant Examiner

U.S. Cl. X.R.

178—6.6; 179—2, 4; 325—65